US008724611B2

(12) United States Patent
Gupta et al.

(10) Patent No.: US 8,724,611 B2
(45) Date of Patent: May 13, 2014

(54) AUTHORIZING TRANSMISSION OF RESOURCE UTILIZATION MESSAGES

(75) Inventors: Rajarshi Gupta, Santa Clara, CA (US); Anastasios Stamoulis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 947 days.

(21) Appl. No.: 12/360,340

(22) Filed: Jan. 27, 2009

(65) Prior Publication Data

US 2009/0225710 A1 Sep. 10, 2009

Related U.S. Application Data

(60) Provisional application No. 61/034,818, filed on Mar. 7, 2008.

(51) Int. Cl.
*H04W 4/00* (2009.01)

(52) U.S. Cl.
USPC .......................................... 370/346

(58) Field of Classification Search
USPC ......... 370/280, 336, 229, 310, 312–313, 322, 370/328–329, 332–333, 338, 341, 346, 370/348–349; 455/455; 718/104
See application file for complete search history.

(56) References Cited

U.S. PATENT DOCUMENTS

| 8,014,349 | B2* | 9/2011 | Kwon et al. | 370/329 |
| 2004/0022213 | A1 | 2/2004 | Choi et al. | |
| 2005/0249148 | A1* | 11/2005 | Nakamata et al. | 370/328 |
| 2007/0047474 | A1 | 3/2007 | Anderson et al. | |
| 2007/0086389 | A1* | 4/2007 | Park et al. | 370/332 |
| 2007/0105574 | A1 | 5/2007 | Gupta et al. | |
| 2007/0115817 | A1 | 5/2007 | Gupta et al. | |
| 2007/0121498 | A1* | 5/2007 | Park et al. | 370/229 |
| 2007/0207814 | A1* | 9/2007 | Usuda et al. | 455/455 |
| 2009/0116434 | A1* | 5/2009 | Lohr et al. | 370/329 |

(Continued)

FOREIGN PATENT DOCUMENTS

| CN | 101057430 A | 10/2007 |
| CN | 101213769 A | 7/2008 |

(Continued)

OTHER PUBLICATIONS

Tao, et al, "Downlink Control Design for Hierarchical Frame Structure," Provisional Patent Application Specification, U.S. Appl. No. 61/034,709, filed Mar. 7, 2008.

(Continued)

*Primary Examiner* — Kwang B Yao
*Assistant Examiner* — Syed M Bokhari
(74) *Attorney, Agent, or Firm* — Nicholas J. Pauley; Peter Michael Kamarchik; Joseph Agusta

(57) ABSTRACT

An authorization scheme limits the number of nodes that send out resource utilization messages. Here, a first node may determine whether a second node is allowed to transmit a resource utilization message, and send a message to the second node indicative of this determination. The second node may then determine whether to send out a resource utilization message based on the message from the first node and the quality of service associated with receive traffic at the second node. In some aspects, a node that is allowed to transmit a RUM may be identified based on whether the node is expected to be scheduled to use a given resource.

75 Claims, 9 Drawing Sheets

(56) References Cited

U.S. PATENT DOCUMENTS

| | | | |
|---|---|---|---|
| 2009/0154418 A1* | 6/2009 | Kang et al. | 370/329 |
| 2009/0228891 A1* | 9/2009 | Tao et al. | 718/104 |
| 2009/0252124 A1* | 10/2009 | Yeo et al. | 370/336 |
| 2009/0262698 A1* | 10/2009 | Suga | 370/329 |
| 2011/0032851 A1* | 2/2011 | Anderson | 370/280 |
| 2012/0207143 A1* | 8/2012 | Banerjee et al. | 370/338 |

FOREIGN PATENT DOCUMENTS

| | | |
|---|---|---|
| EP | 1804404 A1 | 7/2007 |
| EP | 1816883 A1 | 8/2007 |
| WO | WO2005060132 | 6/2005 |
| WO | 2007024120 A1 | 3/2007 |
| WO | WO2007024780 | 3/2007 |
| WO | WO2007051140 | 5/2007 |
| WO | WO2007051148 A2 | 5/2007 |
| WO | WO2007056630 | 5/2007 |

OTHER PUBLICATIONS

3GPP TR 25.899 v0.1.0, HSDPA Enhancements; Release 6, Jun. 1, 2003, pp. 1-20, XP002328238, Ch 5.1-6.1.

3GPP TSG RAN WG1 #46; "Performance of per group rate control (PGRC) with advanced MIMO Receiver," 3GPP, R1-062015, pp. 1-6, Texas Instruments, Tallinn, Estonia, Aug. 28-Sep. 1, 2006.

International Search Report/Written Opinion—PCT/US09/036415—International Search Authority EPO—Jun. 18, 2009.

Jeon, et al: "Channel adaptive CQI reporting schemes for UMTS high-speed downlink packet access," Vehicular Technology Conference, 2006, Sep. 1, 2006, pp. 1-5, ISBN: 978-1-4244-0062-1.

Siemens: "Downlink interference coordination," 3GPP Draft, R1-062375, 3GPP RAN WG1, Aug. 22, 2006, Ch. 1, 2.1, 2.2, 4.

Taiwan Search Report—TW098107451—TIPO—Apr. 24, 2013.

\* cited by examiner

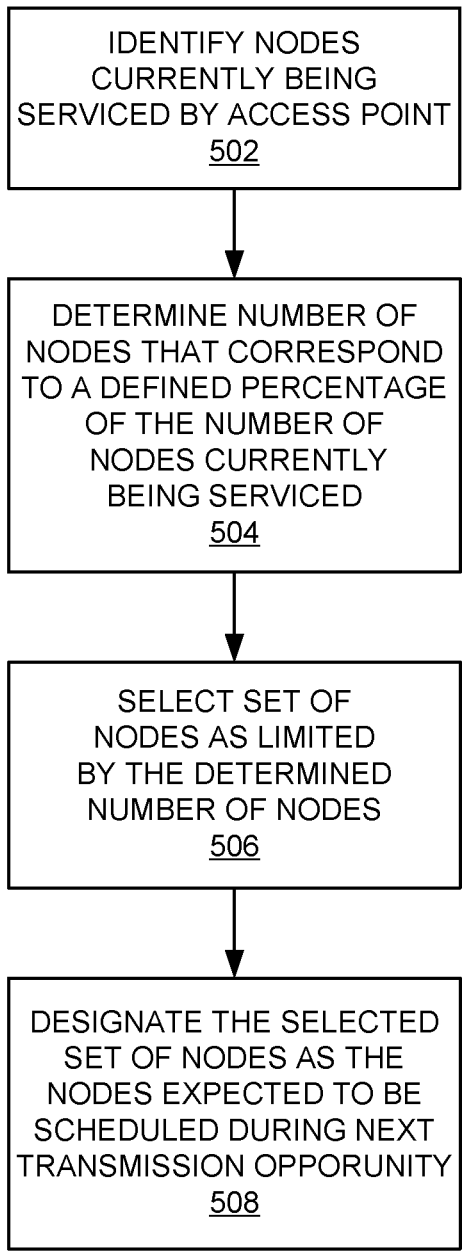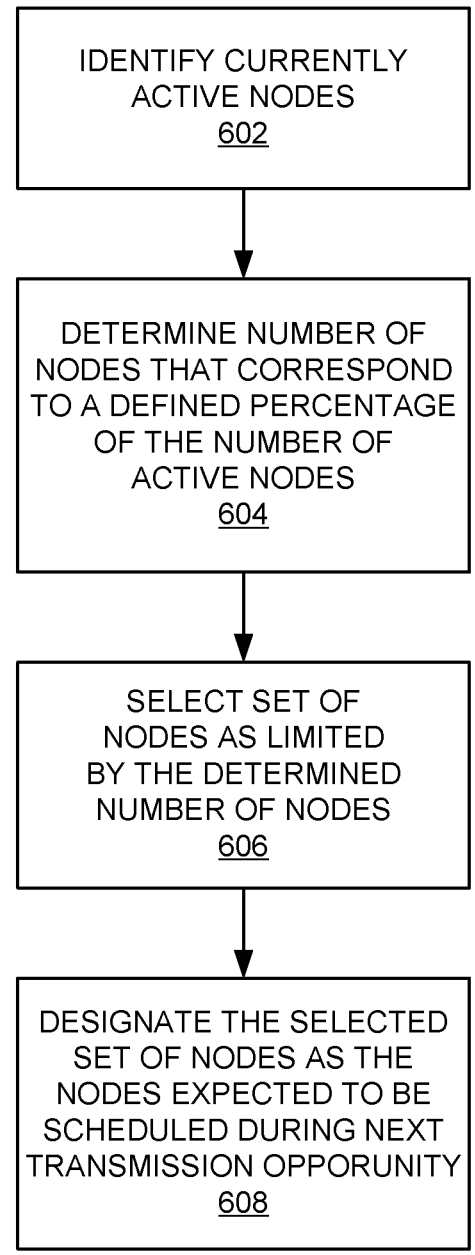
FIG. 5
FIG. 6

AUTHORIZING TRANSMISSION OF RESOURCE UTILIZATION MESSAGES

CLAIM OF PRIORITY

This application claims the benefit of and priority to commonly owned U.S. Provisional Patent Application No. 61/034,818, filed Mar. 7, 2008, the disclosure of which is hereby incorporated by reference herein.

BACKGROUND

1. Field

This application relates generally to wireless communication and more specifically, but not exclusively, to interference mitigation.

2. Introduction

Deployment of a wireless communication system typically involves implementing some form of interference mitigation scheme. In some wireless communication systems, interference may be caused by neighboring wireless nodes. As an example, in a cellular system wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U.S. Patent Application Publication No. 2007/0105574 describes a system where fair-sharing of a wireless channel may be facilitated by joint scheduling of a transmission by transmitting and receiving nodes through the use of a resource utilization message ("RUM"). Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a RUM in an attempt to cause the neighboring transmitting nodes to limit their interfering transmissions. According to related aspects, a RUM may be prioritized (e.g., weighted) to indicate not only that a receiving node is disadvantaged (e.g., due to the interference it sees while receiving) and desires a collision avoidance mode of transmission, but also the degree to which the receiving node is disadvantaged.

A transmitting node that receives a RUM may utilize the fact that it has received a RUM, as well as the priority thereof, to determine an appropriate response. For example, the transmitting node may elect to abstain from transmitting, may reduce its transmit power during one or more designated timeslots, may transmit on another carrier, may ignore the RUM, or may take some other action. The advertisement of the RUMs and associated priorities may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to controlling whether nodes are allowed to transmit RUMs. For example, by controlling which nodes may transmit RUMs for a given transmission opportunity, fewer RUMs may be sent out thereby improving resource utilization in the system under certain circumstances. In this way, the resource may be better utilized since RUMs may not be needlessly sent out by access terminals that are not able to use the resource.

The disclosure relates in some aspects to identifying a node that is allowed to transmit a RUM based on whether the node is expected to be scheduled to use a given resource. For example, an access point may determine which access terminals are likely to be scheduled to use a resource in the next transmission opportunity (e.g., the next available timeslot). The access point may then send messages to those access terminals that inform those access terminals that they are allowed to transmit a RUM. Upon receiving such a message, an access terminal will send a RUM for the designated transmission opportunity in the event the quality of service at the access terminal is below a desired quality of service level.

Various techniques may be employed to determine whether a node is likely to be scheduled. In some cases, an access point may elect to schedule a fixed number of access terminals based on a prioritized list of associated access terminals. In some cases an access point may elect to schedule a fixed percentage of a number of associated access terminals. In some cases an access point may elect to schedule a fixed percentage of a number of active access terminals. In some cases an access point may consider the buffer requirement of each of its associated access terminal to determine which access terminals will be scheduled. Here, the access point may use knowledge of prior transmission opportunities to decide how many of these access terminals will likely be served in the next opportunity. In some cases an access point may consider restrictions imposed by a dynamic carrier allocation scheme (e.g., based on topology or power levels associated with carriers) to determine which access terminals will be scheduled.

BRIEF DESCRIPTION OF THE DRAWINGS

These and other sample aspects of the disclosure will be described in the detailed description and the appended claims that follow, and in the accompanying drawings, wherein:

FIG. 5 is a simplified flowchart of several sample aspects of operations that may be performed to determine whether a node is to be scheduled based on a percentage of serviced nodes;

FIG. 6 is a simplified flowchart of several sample aspects of operations that may be performed to determine whether a node is to be scheduled based on a percentage of active nodes;

Figure 1:
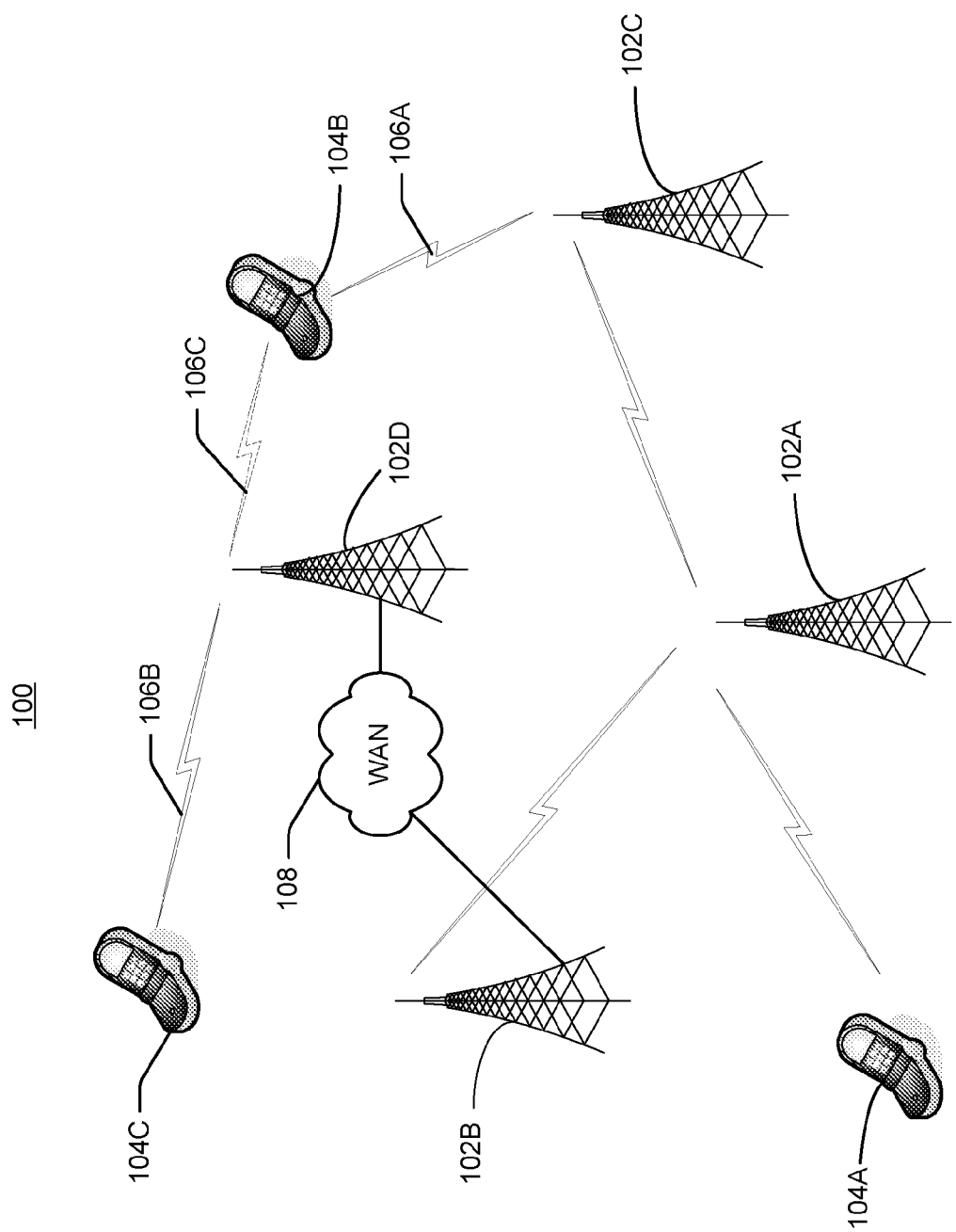
FIG. 1 is a simplified block diagram of a sample communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

As an example of the above, in some aspects a method of communication comprises: identifying a node that will be allowed to transmit a resource utilization message, wherein the identification of the node comprises determining whether the node is expected to be scheduled for an upcoming transmission opportunity; and transmitting a message that indicates that the identified node is allowed to transmit the resource utilization message. In addition, in some aspects the determination of whether the node is expected to be scheduled may be based on an ordering of nodes.

For illustration purposes, various aspects relating to controlling whether a node is allowed to transmit a RUM will be described in the context of a wireless system where nodes such as access terminals send RUMs to other nodes such as access points in an attempt to reserve one or more system resources. It should be appreciated that the teachings herein also may be applicable to other types of nodes, devices, communication links, and communication systems or to similar entities that are referenced using other terminology. For example, an access terminal may be referred to as user equipment, a mobile unit, and so on.

FIG. 1 illustrates several sample aspects of a wireless communication system 100. The system 100 includes several wireless nodes, generally designated as nodes 102 and 104. A given node may receive and/or transmit one or more traffic flows (e.g., data and/or control channels). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, a relay point, or an access point. Referring to FIG. 1, the nodes 102 may comprise access points or relay points and the nodes 104 may comprise access terminals. In some implementations the nodes 102 facilitate communication between the nodes of a network (e.g., a cellular network, a WiMAX network, etc.). For example, when an access terminal (e.g., an access terminal 104A) is within a coverage area of an access point (e.g., an access point 102A) or a relay point, the access terminal 104A may thereby communicate with another device of the system 100 or a device of some other network that is coupled to communicate with the system 100. Here, one or more of the nodes (e.g., nodes 102B and 102D) may comprise a wired access point that provides connectivity to another network or networks (e.g., a wide area network 108 such as the Internet).

In some aspects two or more nodes of the system 100 associate with one another to establish traffic flows between the nodes via one or more communication links. For example, the nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some cases several nodes in the system 100 may attempt to transmit at the same time (e.g., during the same timeslot). Depending on the relative locations of the transmitting and receiving nodes and the transmit power of the transmitting nodes, it may be possible to reliably conduct such concurrent communications. Under these circumstances, the wireless resources of the system 100 may be well utilized as compared to, for example, a system that simply uses a carrier sense multiple access ("CSMA") mode of operation.

Under other circumstances, however, wireless transmissions from a node in the system 100 may interfere with reception at a non-associated node in the system 100. For example, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power of the node 102D, transmissions from the node 102D (as represented by a dashed symbol 106C) may interfere with reception at the node 104B. In a similar manner, transmissions from the node 104B may interfere with reception at the node 102D depending on the location and transmission power of the node 104B.

To mitigate interference such as this, the nodes of a wireless communication system may employ an inter-node messaging scheme. For example, a receiving node that is experiencing interference may transmit a resource utilization message ("RUM") to indicate that the node is disadvantaged in some way. A neighboring node that receives the RUM (e.g., a potential interferer) may elect to limit its future transmissions in some way to avoid interfering with the RUM-sending node (i.e., the receiving node that sent the RUM). Here, a decision by a receiving node to transmit a RUM may be based, at least in part, on quality of service associated with data received at that node via one or more designated resources. For example, a receiving node may transmit a RUM in the event the current level of quality of service for one or more of its links or flows falls below a desired quality of service level. Conversely, the node may not transmit a RUM if the quality of service is acceptable.

Here, a resource may comprise, for example, one or more carriers, one or more subcarriers (e.g., subsets of a frequency band associated with a carrier), one or more interlaces, one or more timeslots, and so on. For illustration purposes, various aspects of the disclosure may be described in the context of resources associated with a forward link. It should be appreciated that the teachings herein may be generally applicable to other types of resources.

As noted above, RUMs may be sent out by receiving nodes. Thus, in a forward link, access terminals may send out RUMs. Consequently, the potential number of RUM-senders may be relatively large in the forward link. Furthermore, while access terminals may send out RUMs based on their own idea of the quality of service, this knowledge may be incomplete due to loading and other scheduling constraints at the access point (e.g., in contrast to the reverse link where RUMs may be sent out by a centralized access point that provides scheduling for all the access terminals, and may therefore maintain consistency in the information for the reverse link). Due to these and/or other factors, various problems may occur when access terminals send out RUMs in the forward link.

First, in some situations there may be too many RUMs in the system. Such a situation may occur, for example, if a large number of access terminals are dissatisfied with their quality of service. This, in turn, may lead to an increase in the load on the control channel upon which the RUMs are sent.

Second, in some situations some of the RUMs may be redundant. For example, the same neighboring access point may hear the same RUMs from several access terminals. In this case, a single one of these RUMs may have been sufficient to clear a resource (e.g., to cause the neighboring access point to limit its transmissions).

Third, in some situations a number of access terminals belonging to the same access point send out RUMs. However, during the subsequent scheduling slot, the access point may only be able to serve a subset of these access terminals. This may be a sub-optimal situation since neighboring access points that had heard RUMs from these non-scheduled access terminals may have kept quiet, and hence lost their chance to transmit.

The disclosure relates in some aspects to techniques for limiting the number of nodes that send out RUMs for one or more resources. In some aspects the number of access terminals that send out RUMs for the forward link ("FL") may be limited based on scheduling decisions made by the associated access point. For example, a list of which access terminals are likely to be scheduled during the next transmission opportunity may be compiled at the access point and then communicated to the relevant access terminals. Access terminals in the system are then allowed to send RUMs if two conditions are satisfied. First, the access terminal is amongst the likely candidates to be scheduled, assuming the access point gets to transmit in a subsequent slot. Second, the access terminal is eligible to send RUMs under the rules described above (e.g., low quality of service).

In some aspects these techniques may mitigate one or more of problems described in the third problem area set forth above. In doing so, the number of RUMs in the system may be reduced, thereby potentially mitigating one or more of problems described in the first and second problem areas set forth above.

With the above in mind, sample operations that may be performed by a system such as the system 100 are described by the flowcharts of FIGS. 2-9. The operations of FIGS. 2-9 (or any other operations discussed or taught herein) may be performed by specific components (e.g., components of a system 1000 as depicted in FIG. 10). It should be appreciated, however, that these operations may be performed by other types of components and may be performed using a different number of components. It also should be appreciated that one or more of the operations described herein may not be employed in a given implementation.

FIG. 10 illustrates sample components that may be employed in a first node that is designated as a transmitting node 1002 (e.g., an access point), and a second node that is designated as a receiving node 1004 (e.g., an access terminal). To reduce the complexity of FIG. 10, only two nodes are shown in the system 1000. In practice, however, a system such as the system 1000 (e.g., corresponding to the system 100) will have many nodes operating as transmitting nodes and many nodes operating as receiving nodes at a given time. The transmitting node 1002 may transmit to one or more receiving nodes (e.g., as represented in some instances herein by receiving node 1004). In addition, the transmitting node 1002 receives RUMs from one or more receiving nodes (e.g., as represented in some instances herein by receiving node 1004).

The nodes 1002 and 1004 include respective transceivers 1006 and 1008 for communicating with other nodes. The transceiver 1006 includes a transmitter 1010 for sending signals (e.g., messages) and a receiver 1012 for receiving signals (e.g., messages such as RUMs in some cases). The transceiver 1008 includes a transmitter 1014 for sending signals (e.g., messages such as RUMs in some cases) and a receiver 1016 for receiving signals (e.g., messages). The nodes 1002 and 1004 also include other components that may be used in conjunction with sending RUMs and controlling the transmission of RUMs as taught herein.

For purposes of illustration, several components that may be employed in conjunction with sending a message to control whether another node is allowed to send a RUM are shown in the node 1002. The node 1002 may include a scheduler 1028 for scheduling use of one or more resources (e.g., timeslots, carriers, and so on). The node 1002 may include a node identifier 1030 configured to identify nodes that are allowed to send RUMs (e.g., based on whether a node is expected to be scheduled as discussed herein). In addition, the node 1002 may maintain node information 1032 (e.g., stored in a data memory) that is used to determine whether a given node is expected to be scheduled. The node 1002 also may include one or more transmit queues 1034 for storing information to be transmitted to another node. Furthermore, the node 1002 also may include a communication controller 1036 for processing messages (e.g., generating messages to be transmitted) and providing other communication related operations.

For purposes of illustration, several components that may be employed in conjunction with conditionally sending a RUM based, at least in part, on receipt of an authentication message are shown in the node 1004. The node 1004 may include a quality of service determiner 1018 configured to determine whether quality of service associated with receive traffic is acceptable (e.g., as discussed herein). The node 1004 may include a resource identifier 1020 configured to identify one or more resources on which interference is to be cleared by a RUM. The node 1004 may include a priority determiner 1022 for determining priority associated with a RUM. The node 1004 may include a RUM generator 1024 that generates RUMs. The node 1004 may include a transmission controller 1026 configured to control the transmission (e.g., broadcast) of RUMS to other nodes in the system.

Figure 2:
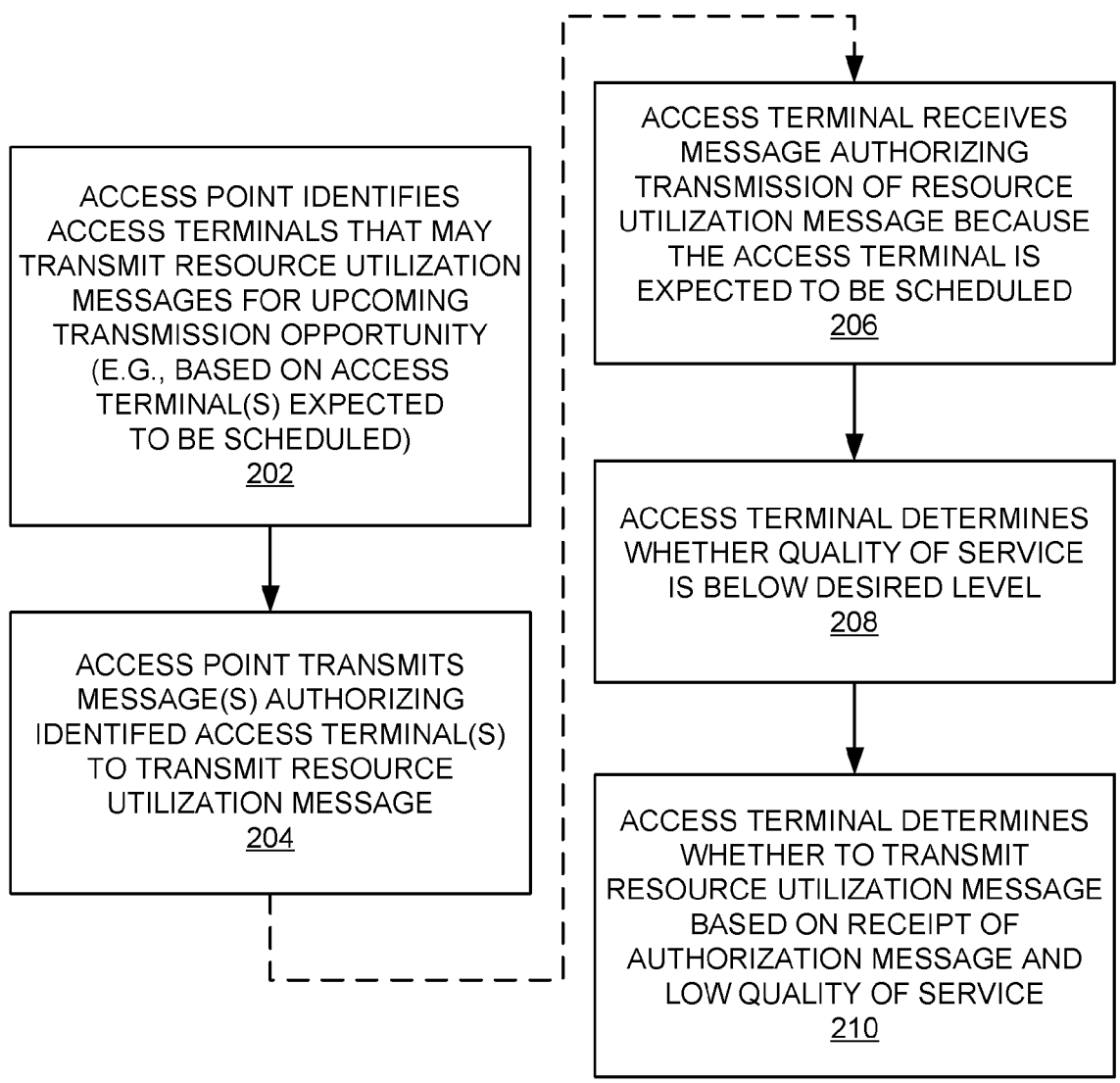
FIG. 2 is a simplified flowchart of several sample aspects of operations that may be performed to authorize transmission of RUMs.

Referring now to FIG. 2, as represented by block 202, the access point (e.g., the node identifier 1030) identifies one or more access terminals that may transmit RUMs for an upcoming transmission opportunity (e.g., a timeslot). To this end, the access point determines which of its associated access terminals (e.g., the access terminals served by the access point) are expected to be scheduled during the transmission opportunity. In some aspects this determination may be based on scheduling decisions made by the scheduler 1028. Here, the scheduler 1028 generates a schedule (e.g., a list) that identifies the access terminals that may receive traffic via the forward link during a given transmission opportunity. As described in more detail below, the access point may employ various techniques to identify an access terminal that is expected to be scheduled.

In practice, the list may comprise a list of access terminals that are expected (e.g., predicted) to be scheduled, as opposed to a list of access terminal that will be scheduled. That is, the access point may not end up actually scheduling all of these access terminals. Hence, there may be inaccuracies in the access terminals predicted to be scheduled. Several factors may contribute to the inexactness of such a prediction. In some cases, the access point may not get an opportunity to transmit. For example, the access point's transmission may be limited due to receipt of a higher-priority RUM from a neighboring non-associated access terminal. In other words, another access terminal in the system that is at a greater disadvantage than the access terminals associated with the access point may "win" the contention for the transmission opportunity. In this case, the access point may end up not actually scheduling any access terminals for the transmission opportunity. In addition, in a multi-carrier system the access point may be end up transmitting over a subset of the available carriers. Hence, the access point may not be able to serve all of the access terminals that it had originally planned. In some cases, a high-priority packet (e.g., including data with strict latency requirements such as voice traffic) may arrive at the access point's scheduler after the list was generated, but before the next transmission opportunity. In this case, the access point may elect to schedule the access terminal that is to receive the higher priority information before scheduling an access terminal or access terminals identified in the list.

In view of the above, the predicted set of access terminals may be determined in a conservative manner. For example, a conservative approach may result in a few extra RUMs being sent out.

As represented by block 204, the access point transmits one or more messages that authorize the access terminals identified in the list to transmit RUMs. To this end, the communication controller 1036 may generate a message that indicates that an access terminal is allowed to transmit a RUMs because the access terminal is expected to be scheduled (e.g., for the next transmission opportunity). The transmitter 1010 may then transmit the message to the designated access terminal(s). In some cases, a dedicated message may be sent to each access terminal. In some cases a common message may be sent out (e.g., broadcast), whereby the message includes an indication of each access terminal in the list.

Blocks 206-210 represent operations that may be performed by one of the access terminals identified in the list. As represented by block 206, the access terminal (e.g., the receiver 1016) receives a message that indicates that the access terminal is allowed to transmit a RUM because the access terminal is expected to be scheduled.

As represented by block 208, the access terminal (e.g., the quality of service determiner 1018) determines whether the access terminal is able to meet its quality of service ("QoS") requirements for receive traffic on a given resource. The quality of service requirements may be in the form of throughput (e.g., for full buffer traffic), latency (e.g., for voice traffic), average spectral efficiency, minimum carrier-to-interference ratio ("C/I"), or some other suitable metrics or metrics. Thus, the determination of block 208 may involve, for example, comparing a corresponding metric indicative of the current quality of service for the receive traffic with a quality of service threshold indicative of a desired level of quality of service. In this way, the access terminal may determine whether the current quality of service is below a desired level (e.g., less than or equal to the threshold level).

As represented by block 210, the access terminal (e.g., the transmission controller 1026) determines whether to transmit a RUM based on the determination of whether the access terminal is able to meet its quality of service requirements at block 208 and based on receipt of the RUM authorization message at block 206. If a decision is made to transmit a RUM, the RUM generator 1024 may then generate a RUM.

A RUM may take various forms. For example, in some cases a RUM may consist of a series of tones. In some cases different tones may cover different frequency bands. In some cases the RUMs from different devices may be ordered in some manner (e.g., in time and/or frequency)

A RUM may include (e.g., encapsulate) a priority that signifies the "degree of disadvantage" faced by the node that transmits the RUM. As mentioned above, the degree of disadvantage may be a function of the node's actual quality of service and the node's desired quality of service. In FIG. 10, this priority is determined by the priority determiner 1022.

Priority information associated with a RUM may take various forms. For example, in some cases priority information may take the form of a weighting factor (weight). Such a weighting factor may be normalized. For example, a weighting factor may be normalized so that it is represented by a few bits (e.g., two or three bits) to reduce the overhead associated with the weighting factor. In some cases priority may be indicated by the ordering of RUMs (e.g., in time and/or frequency). For example, RUMs occurring earlier in time and/or on certain frequencies may be associated with a higher priority.

A RUM may optionally including an indication that identifies the resources to which the RUM applies (e.g., as identified by the resource identifier 1020). For example, in a multi-carrier system, the available bandwidth is divided into a number of carriers (e.g., 4 carriers). Thus, nodes in the system may be scheduled over one or more carriers (e.g., scheduled over several subcarriers of a given carrier), thereby allowing better sharing of the resources.

A RUM may be used to mitigate (e.g., clear) interference on one or more channels. In some cases a RUM relates to a single channel (e.g., a single carrier that is associated with a given frequency band). In other cases a RUM may relate to a set of channels. For example, in a multi-channel system, a node may transmit a RUM whenever it wishes to clear interference on all or a portion of the channels. Thus, in some cases, a RUM may be defined to relate to a subset of the channels. Here, when a node wishes to clear interference on a subset of the channels, the node may transmit a RUM in conjunction with an indication of the channel(s) to which the RUM applies. In such a case, the channel indication may be included in the RUM.

A channel indication may take various forms. For example, in some cases the channel indication may take the form of a set of bits where each bit corresponds to a branch of a tree, where each branch corresponds, in turn, to a channel. For example, one bit may correspond to a first channel, another bit may correspond to a set of channels (e.g., which may include one or more channels or sets of channels). In other cases, the channel indication may take the form of a bit mask. For example, each bit of the mask may correspond to a unique one of the channels.

Once the RUM is generated, the access terminal (e.g., the transmitter 1014) transmits (e.g., via a frequency-division multiplexed control channel) the RUM so it will be heard by nearby transmitting nodes. These nodes include, for example, an associated access point, as well as transmitting nodes (e.g., non-associated access points) that may potentially interference with reception at the access terminal.

When one of these nodes hears the RUM, the node will compare the weight of the incoming RUM to any RUM that it has heard from its own receiver(s). If the weight of the received RUMs from any non-associated receiving nodes is greater than the weight of any received RUMs from receiving nodes that are associated with the transmitting node, the transmitting node may obey the higher weight RUMs by decreasing the interference it causes to the nodes whose RUMs it has decided to obey.

There are various methods by which the transmitting node may obey a RUM for an upcoming transmission opportunity (e.g., the next scheduled timeslot). Several examples include: backing-off in time (e.g., refraining from transmitting over some slots or interlaces); backing-off in frequency (e.g., refraining from transmitting over some frequency bands or carriers); and backing-off in power (e.g., reducing transmit power during the next timeslot).

In a multi-carrier system, when a transmitting node hears the RUM, it may obey the RUM only on the carriers specified by the carrier indication. When a transmitting node elects to obey multiple RUMs from different receivers, it may perform an 'OR' operation on the carriers specified by all of the RUM carrier indications. The complement of the result of this operation may thus indicate the carriers that the transmitting node may transmit on.

As mentioned above, a determination (e.g., a prediction or estimate) as to the access terminals likely to be scheduled (e.g., in an upcoming slot) may be made in various ways (e.g., using various algorithms). Several examples will now be described in more detail in conjunction with FIGS. 3-9.

Figure 3:
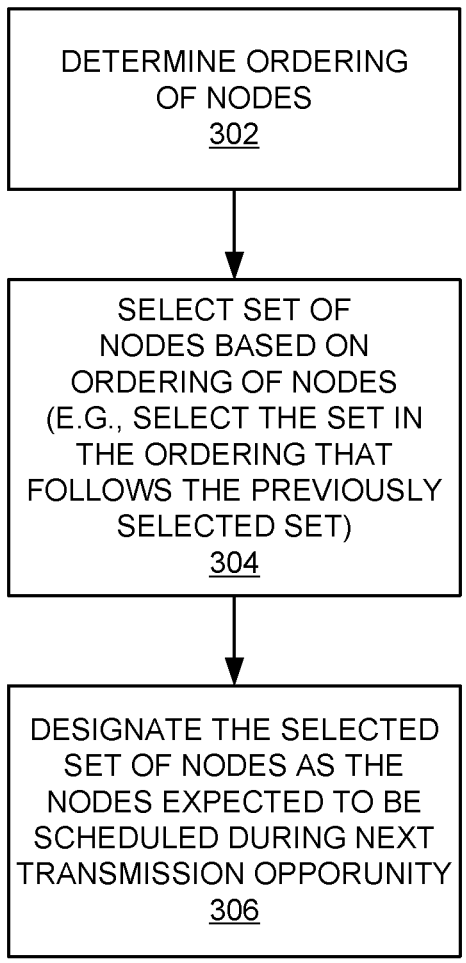
FIG. 3 is a simplified flowchart of several sample aspects of operations that may be performed to determine whether a node is to be scheduled based on node ordering.

FIG. 3 illustrates sample operations that may be performed to determine whether a node is expected to be scheduled based on node ordering. As represented by block 302, the access point orders its associated access terminals. For example, these access terminals (e.g., which may be referred to as the child nodes of the access point) may be ordered based on some metric or based on a random ordering. As represented by block 304, when the access point schedules a given transmission opportunity, the access point selects a set of access terminals based on the order and, in some cases, based on the last set of access terminals that were scheduled. For example, the access point may look at a metric ahead of time and decide on its order of access terminals to be scheduled in the next slot. As an example, if the ordering is designated nodes 1, 2, 3, 4, etc., and nodes 1 and 2 were scheduled in the last transmission opportunity, nodes 3 and 4 may be selected. As represented by block 306, the access point designates the selected set of nodes as the nodes expected to be scheduled during the next transmission opportunity (e.g., corresponding to the access terminals identified at block 202 above).

Figure 4:
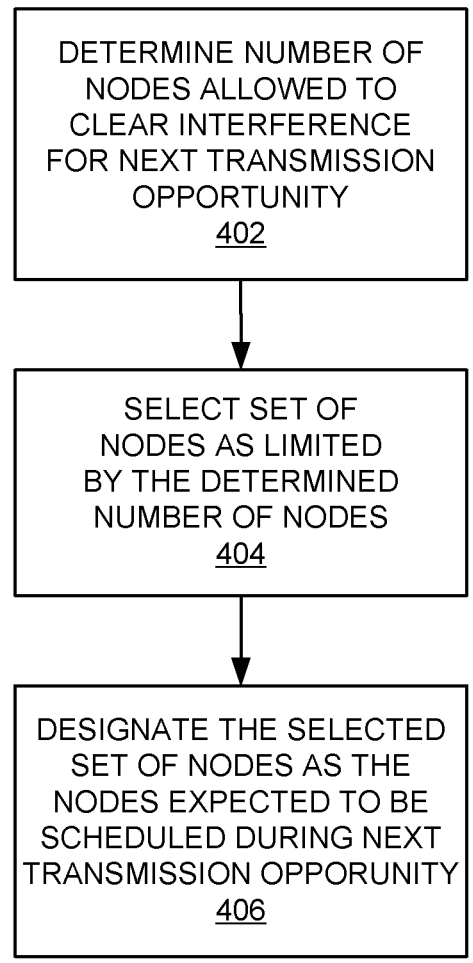
FIG. 4 is a simplified flowchart of several sample aspects of operations that may be performed to determine whether a node is to be scheduled based on a maximum number of nodes.

FIG. 4 is a simplified flowchart of several sample aspects of operations that may be performed to determine whether a node is expected to be scheduled based on a maximum number of nodes. As represented by block 402, the access point determines a maximum number of nodes that are allowed to clear interference during the next transmission opportunity. For example, due to control channel limitations (e.g., only a certain number of messages may be sent over a control channel) or other factors, the access point may only be able to schedule a certain maximum number of nodes for a given transmission opportunity. Consequently, the access point may decide to limit to a fixed number (e.g., a maximum of 3 or 4), the number of access terminals allowed to send RUMs. As represented by block 404, the access point selects a set of nodes, where the number of nodes in the set is limited by the determined number of nodes from block 402. As represented by block 406, the access point designates the selected set of nodes as the nodes expected to be scheduled during the next transmission opportunity.

FIG. 5 is a simplified flowchart of several sample aspects of operations that may be performed to determine whether a node is expected to be scheduled based on a percentage of serviced nodes. For example, the access point may consider the total number of access terminals it is serving (e.g., connected to) and pick a fixed percentage of them. Accordingly, as represented by block 502, the access point determines the number of nodes that are currently being serviced by the access point. As represented by block 504, the access point determines the number of nodes that correspond to a defined percentage (e.g., 25%) of the number of nodes currently being serviced. As represented by block 506, the access point selects a set of nodes, where the number of nodes in the set is limited by the determined number of nodes from block 504. As represented by block 508, the access point designates the selected set of nodes as the nodes expected to be scheduled during the next transmission opportunity.

FIG. 6 is a simplified flowchart of several sample aspects of operations that may be performed to determine whether a node is expected to be scheduled based on a percentage of active nodes. For example, the access point may consider the number of active access terminals and pick a fixed percentage of them. Accordingly, as represented by block 602, the access point determines the number of nodes with which the access point is engaged in active communication (e.g., the access point has data to send to the nodes). As represented by block 604, the access point determines the number of nodes that correspond to a defined percentage (e.g., 75%) of the number of active nodes. As represented by block 606, the access point selects a set of nodes, where the number of nodes in the set is limited by the determined number of nodes from block 604. As represented by block 608, the access point designates the selected set of nodes as the nodes expected to be scheduled during the next transmission opportunity.

Figure 7:
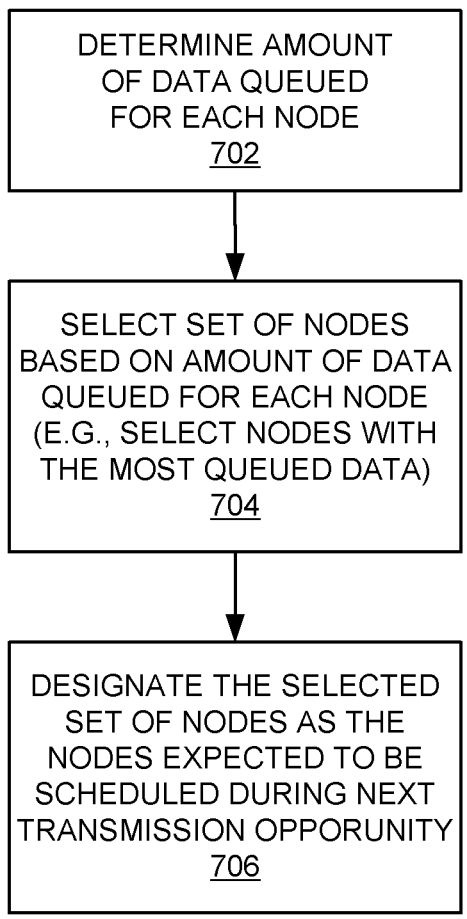
FIG. 7 is a simplified flowchart of several sample aspects of operations that may be performed to determine whether a node is to be scheduled based on queued data.

FIG. 7 is a simplified flowchart of several sample aspects of operations that may be performed to determine whether a node is expected to be scheduled based on queued data. For example, the access point may consider the buffer size requirements for each of its associated access terminals (e.g., the access terminals at the top of its queue). Here, scheduling estimates may be based on the amount of data in respective queues (e.g., transmit queues 1034) associated with each of the access terminals. Accordingly, as represented by block 702, the access point determines the amount of data queued for transmission to each node. As represented by block 704, the access point selects a set of nodes based on the amount of data queued for each node. For example, the selected set of nodes may be those nodes that have the most queued data waiting to be sent to them. As represented by block 706, the access point designates the selected set of nodes as the nodes expected to be scheduled during the next transmission opportunity.

Figure 8:
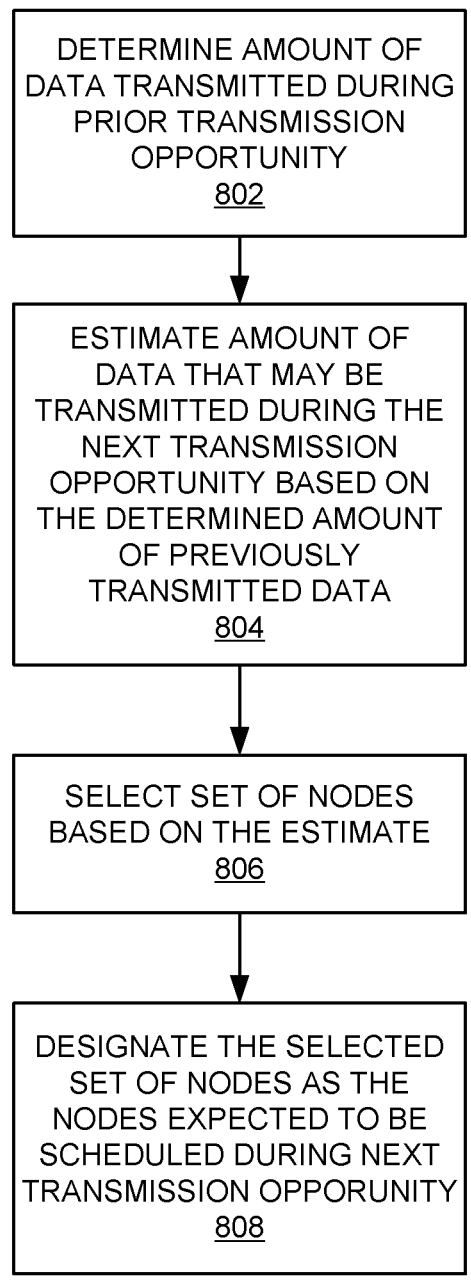
FIG. 8 is a simplified flowchart of several sample aspects of operations that may be performed to determine whether a node is to be scheduled based on transmitted data.

Referring now to FIG. 8, the access point may estimate the amount of data it will be able to send, based on its knowledge of prior transmissions (e.g., how much data was able to be sent in one or more prior transmission opportunities). The access point may then decide how many of the top access terminals (e.g., identified in FIG. 7) will likely be scheduled based on the above information. As represented by block 802, the access point determines the amount of data that was transmitted during one or more prior transmission opportunities. As represented by block 804, the access point estimates the amount of data that may be transmitted during the next transmission opportunity based on the amount of data that was previously transmitted as determined at block 802. As a simplified example, the access terminal may determine at block 802 that it has been able to send on the order of 20 blocks of data each transmission opportunity. As represented by block 806, the access point selects a set of nodes based on the estimate of block 804. Continuing with the above example, assume that the access terminal has 7 blocks of data queued to be transmitted to each of five nodes. That is, there are five transmit queues 1034, and each queue contains 7 blocks of data. In this case, the access point may determine at block 806 that it may schedule three nodes for the next transmission opportunity. As represented by block 808, the access point then designates the selected set of nodes as the nodes expected to be scheduled during the next transmission opportunity.

Figure 9:
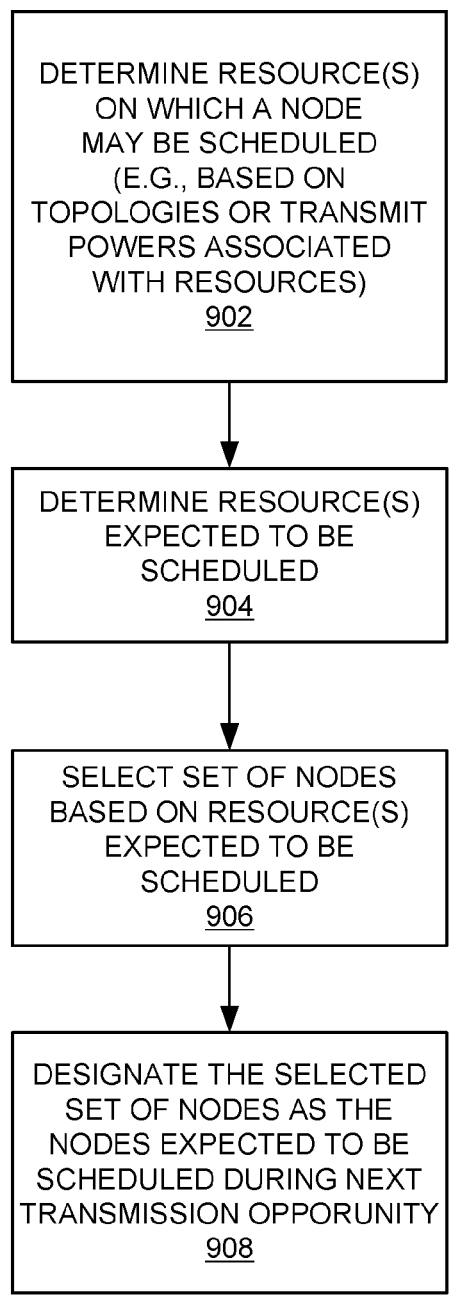
FIG. 9 is a simplified flowchart of several sample aspects of operations that may be performed to determine whether a node is to be scheduled based on one or more resources associated with the node.
Figure 10:
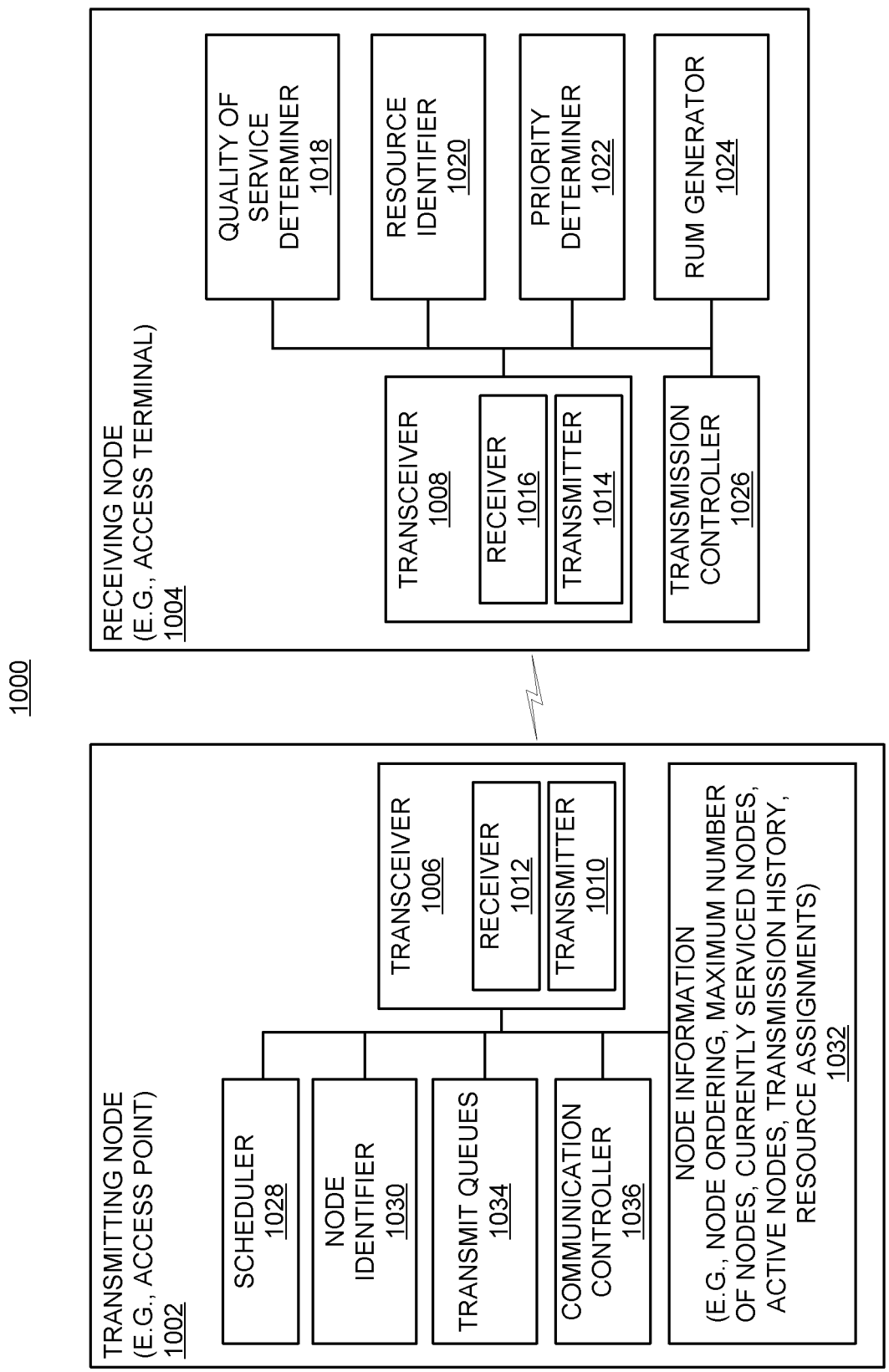
FIG. 10 is a simplified block diagram of several sample components of communication nodes.

FIG. 9 is a simplified flowchart of several sample aspects of operations that may be performed to determine whether a node is expected to be scheduled based on one or more resources associated with the node. For example, for multi-carrier operation (e.g., in cases where RUMs are used as a means to achieve dynamic carrier allocation based on topology of the access points or based on different power levels associated with different carriers), the access point may prefer to schedule only particular carriers (e.g., a subset of the available carriers) in subsequent slots. In such a scenario, the access point may have grouped its associated access terminals in (perhaps overlapping) subsets. For example, the access terminals may be grouped based on which subcarriers a given access terminal may be scheduled on. Such subsets may thus be tagged by the corresponding carriers. For example, a subset [1,2] may denote the set of access terminals that can be scheduled on carrier 1 or carrier 2 (e.g., out of carriers 1, 2, 3, and 4). Thus, if the access point decides to transmit only on carrier 1 and carrier 2 in the next slots/interlaces, the access point may allow the access terminals that belong to subset [1,2] to send out RUMs during the next slots/interlaces. In contrast, the access point may not allow the access terminals that belong to subset [3,4] to send out RUMs during the next slots/interlaces.

In some aspects, a given node (e.g., an access terminal) may be assigned to use certain carriers based on the topology of the node and/or based on the transmit power of the node. As an example, if two transmitting nodes (e.g., access points) are relatively close to one another, one node may transmit on a first carrier at a first power level and on a second carrier at a second power level (e.g., higher than the first power level). Conversely, the other node may transmit on the first carrier at the second power level and on the second carrier at the first power level. In this way, transmissions by the nodes at the higher power levels (e.g., where the coverage areas of the nodes may overlap) may use different carriers, thereby mitigating potential interference between the nodes. Continuing with this example, a receiving node (e.g., an access terminal) that is associated with one of these transmitting nodes may operate on a different channel (and, perhaps, a different power level) depending on how close the receiving node is to the transmitting node. For example, if an access terminal is relatively close to an access point, the access terminal may communicate with the access point on the channel associated with the first power level (lower power level). Conversely, if the access terminal node is relatively far from the access point, the access terminal may communicate with the access point on the channel associated with the second power level (higher power level).

Referring to the flowchart of FIG. 9, as represented by block 902, the access point may therefore determine on which resource(s) a given node may be scheduled. For example, as discussed above, this determination may be based on a static resource assignment for the node, a topology associated with the node, the current transmit power of the node, or some other factor.

As represented by block 904, the access point determines which resource is or resources are expected to be scheduled during the next transmission opportunity. For example, the access point may schedule a first portion of the resources (e.g., channels 1 and 2) for one transmission opportunity, then schedule a second portion of the resources (e.g., channels 3 and 4) for a second transmission opportunity, and so on.

As represented by block 906, the access point selects a set of nodes based on which resource is or resources are expected to be scheduled. For example, if the access point expects to schedule channels 1 and 2 during the next transmission opportunity, the access point may select those nodes that may be scheduled on channels 1 and 2 (e.g., as opposed to nodes that can only be scheduled on channels 3 and 4).

As represented by block 908, the access point then designates the selected set of nodes as the nodes expected to be scheduled during the next transmission opportunity.

Figure 11:
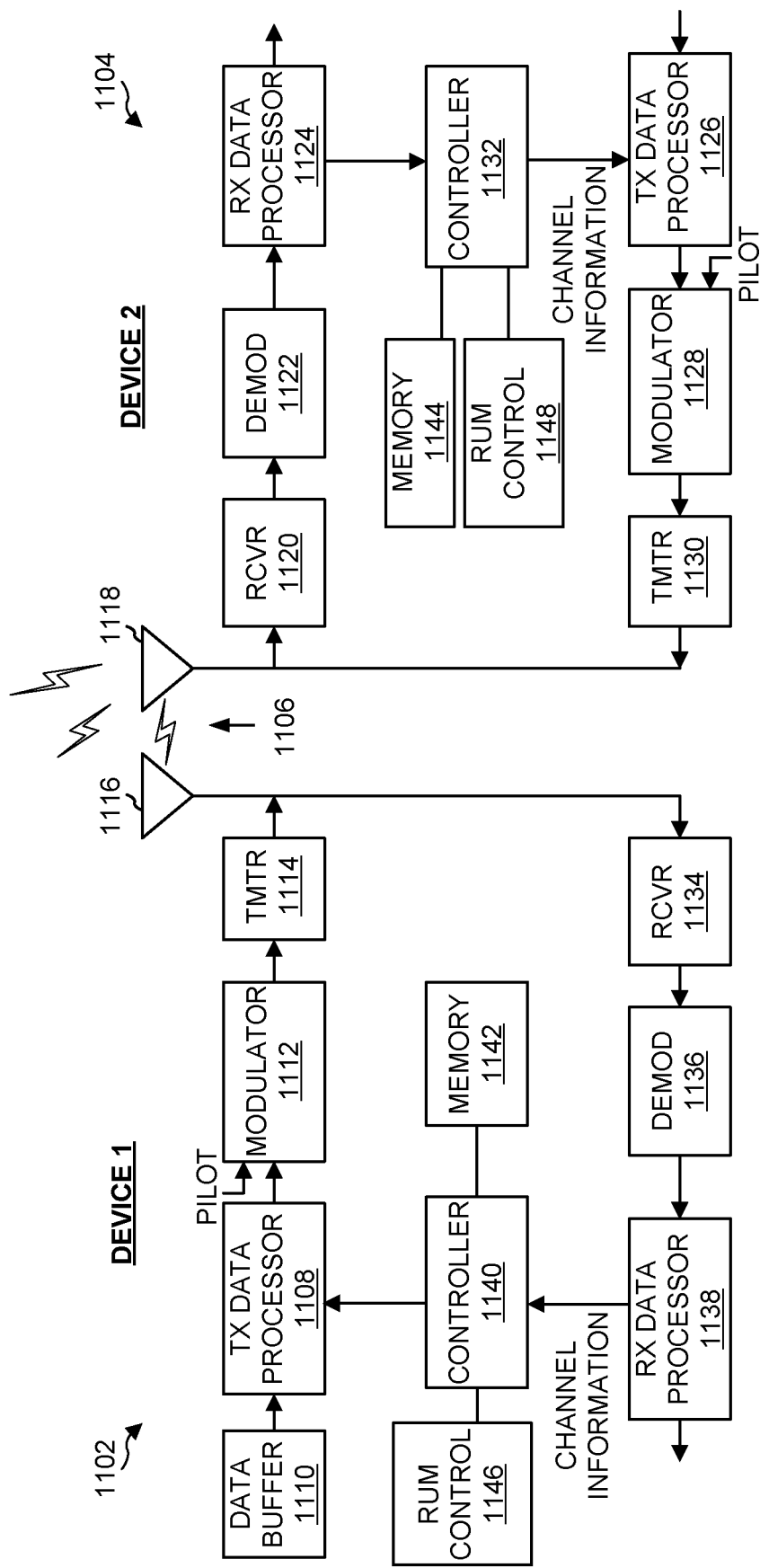
FIG. 11 is a simplified block diagram of several sample aspects of communication components.

The teachings herein may be incorporated into a device employing various components for communicating with at least one other wireless device. FIG. 11 depicts several sample components that may be employed to facilitate communication between devices. Here, a first device 1102 (e.g., an access terminal) and a second device 1104 (e.g., an access point) are adapted to communicate via a wireless communication link 1106 over a suitable medium.

Initially, components involved in sending information from the device 1102 to the device 1104 (e.g., a reverse link) will be treated. A transmit ("TX") data processor 1108 receives traffic data (e.g., data packets) from a data buffer 1110 or some other suitable component. The transmit data processor 1108 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1112 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1114 processes (e.g., converts to analog, filters, amplifies, and frequency upconverts) the output chip stream and generates a modulated signal, which is then transmitted from an antenna 1116.

The modulated signals transmitted by the device 1102 (along with signals from other devices in communication with the device 1104) are received by an antenna 1118 of the device 1104. A receiver ("RCVR") 1120 processes (e.g., conditions and digitizes) the received signal from the antenna 1118 and provides received samples. A demodulator ("DEMOD") 1122 processes (e.g., demodulates and detects) the received samples and provides detected data symbols, which may be a noisy estimate of the data symbols transmitted to the device 1104 by the other device(s). A receive ("RX") data processor 1124 processes (e.g., symbol demaps, deinterleaves, and decodes) the detected data symbols and provides decoded data associated with each transmitting device (e.g., device 1102).

Components involved in sending information from the device 1104 to the device 1102 (e.g., a forward link) will be now be treated. At the device 1104, traffic data is processed by a transmit ("TX") data processor 1126 to generate data symbols. A modulator 1128 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1130 and transmitted from the antenna 1118. In some implementations signaling for the forward link may include power control commands and other information (e.g., relating to a communication channel) generated by a controller 1132 for all devices (e.g. terminals) transmitting on the reverse link to the device 1104.

At the device 1102, the modulated signal transmitted by the device 1104 is received by the antenna 1116, conditioned and digitized by a receiver ("RCVR") 1134, and processed by a demodulator ("DEMOD") 1136 to obtain detected data symbols. A receive ("RX") data processor 1138 processes the detected data symbols and provides decoded data for the device 1102 and the forward link signaling. A controller 1140 receives power control commands and other information to control data transmission and to control transmit power on the reverse link to the device 1104.

The controllers 1140 and 1132 direct various operations of the device 1102 and the device 1104, respectively. For example, a controller may determine an appropriate filter, reporting information about the filter, and decode information using a filter. Data memories 1142 and 1144 may store program codes and data used by the controllers 1140 and 1132, respectively.

FIG. 11 also illustrates that the communication components may include one or more components that perform interference management operations as taught herein. For example, a RUM control component 1146 may cooperate with the controller 1140 and/or other components of the device 1102 to send and receive signals to another device (e.g., device 1104) as taught herein. Similarly, a RUM control component 1148 may cooperate with the controller 1132 and/or other components of the device 1104 to send and receive signals to another device (e.g., device 1102). It should be appreciated that for each device 1102 and 1104 the functionality of two or more of the described components may be provided by a single component. For example, a single processing component may provide the functionality of the RUM control component 1146 and the controller 1140 and a single processing component may provide the functionality of the RUM control component 1148 and the controller 1132.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (I×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may thus include various components that perform functions based on information transmitted by or received at the wireless node. For example, an access point and an access terminal may include an antenna for transmitting and receiving signals (e.g., messages relating to control and/or data). An access point also may include a traffic manager (e.g., scheduler) configured to manage data traffic flows that its receiver receives from a plurality of wireless nodes or that its transmitter transmits to a plurality of wireless nodes. In addition, an access terminal may include a user interface configured to output an indication based on received data (e.g., received via a resource of a plurality of resources).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 12:
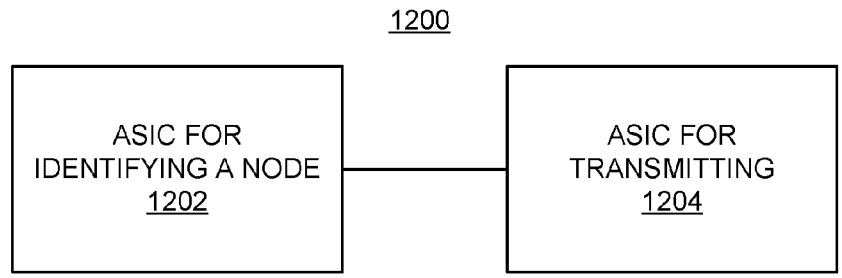
FIGS. 12 and 13 are simplified block diagrams of several sample aspects of apparatuses configured to provide functionality relating to authorizing transmission of RUMs as taught herein.
Figure 13:
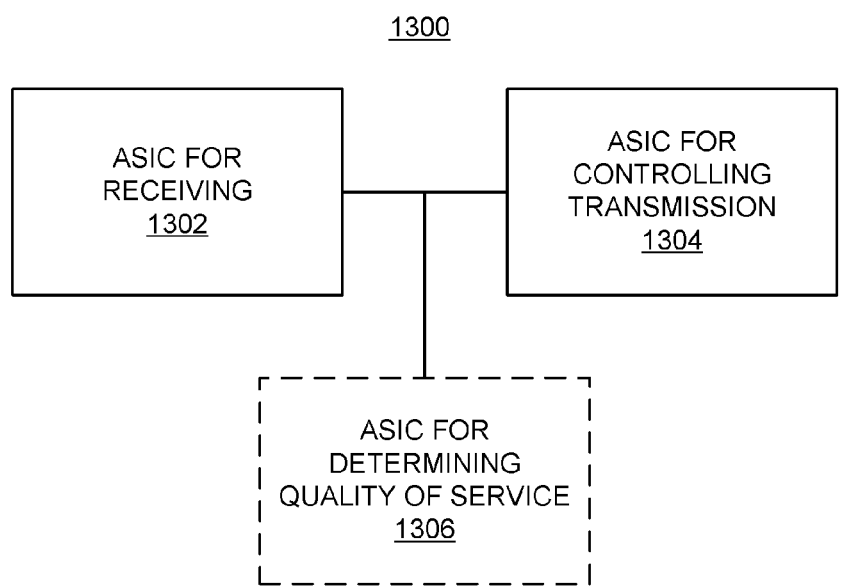

The components described herein may be implemented in a variety of ways. Referring to FIGS. 12 and 13, apparatuses 1200 and 1300 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1200 and 1300 may include one or more modules that may perform one or more of the functions described above with regard to various figures. For example, an ASIC for identifying a node 1202 may correspond to, for example, a node identifier as discussed herein. An ASIC for transmitting 1204 may correspond to, for example, a transmitter as discussed herein. An ASIC for receiving 1302 may correspond to, for example, a receiver as discussed herein. An ASIC for controlling transmission 1304 may correspond to, for example, a transmission controller as discussed herein. An ASIC for determining quality of service 1306 may correspond to, for example, a quality of service determiner as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1200 and 1300 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 12 and 13 as well as other components and functions described herein, may be implemented using any suitable means. Such means also may be implemented, at least in part, using corresponding structure as taught herein. For example, the components described above in conjunction with the "ASIC for" components of FIGS. 12 and 13 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising: identifying among a plurality of nodes a node that will be allowed to transmit a resource utilization message, wherein identifying the node comprises determining whether the node is expected to be scheduled for an upcoming transmission opportunity; transmitting an authorization message that indicates that the identified node is allowed to transmit the resource utilization message; and receiving the resource utilization message transmitted by the identified node, the resource utilization message being transmitted based on receipt of the authorization message and based on determination of low quality of service at the identified node.

2. The method of claim 1, wherein the determination of whether the node is expected to be scheduled is based on an ordering of said plurality of nodes.

3. The method of claim 1, wherein the determination of whether the node is expected to be scheduled is based on a defined maximum number of nodes that are allowed to clear interference for the upcoming transmission opportunity.

4. The method of claim 1, wherein the determination of whether the node is expected to be scheduled is based on a defined percentage of nodes that are currently being serviced by an access point.

5. The method of claim 1, wherein the determination of whether the node is expected to be scheduled is based on a defined percentage of active nodes.

6. The method of claim 1, wherein the determination of whether the node is expected to be scheduled is based on an amount of data queued for transmission to the node.

7. The method of claim 1, wherein the determination of whether the node is expected to be scheduled is based on an estimate of an amount of data that may be sent to the node during the upcoming transmission opportunity.

8. The method of claim 7, wherein the estimate is based on an amount of data transmitted during a prior transmission opportunity.

9. The method of claim 1, wherein the determination of whether the node is expected to be scheduled is based on whether a resource upon which the node may be scheduled is expected to be scheduled for the upcoming transmission opportunity.

10. The method of claim 9, further comprising determining that the node may be scheduled on the resource based on at least one transmit power associated with the resource.

11. The method of claim 1, wherein the node comprises an access terminal.

12. An apparatus for communication, comprising: means for identifying among a plurality of nodes a node that will be allowed to transmit a resource utilization message, wherein identifying the node comprises determining whether the node is expected to be scheduled for an upcoming transmission opportunity; means for transmitting an authorization message that indicates that the identified node is allowed to transmit the resource utilization message; and means for receiving the resource utilization message transmitted by the identified node, the resource utilization message being transmitted based on receipt of the authorization message and based on determination of low quality of service at the identified node.

13. The apparatus of claim 12, wherein the determination of whether the node is expected to be scheduled is based on an ordering of nodes.

14. The apparatus of claim 12, wherein the determination of whether the node is expected to be scheduled is based on a defined maximum number of nodes that are allowed to clear interference for the upcoming transmission opportunity.

15. The apparatus of claim 12, wherein the determination of whether the node is expected to be scheduled is based on a defined percentage of nodes that are currently being serviced by an access point.

16. The apparatus of claim 12, wherein the determination of whether the node is expected to be scheduled is based on a defined percentage of active nodes.

17. The apparatus of claim 12, wherein the determination of whether the node is expected to be scheduled is based on an amount of data queued for transmission to the node.

18. The apparatus of claim 12, wherein the determination of whether the node is expected to be scheduled is based on an estimate of an amount of data that may be sent to the node during the upcoming transmission opportunity.

19. The apparatus of claim 18, wherein the estimate is based on an amount of data transmitted during a prior transmission opportunity.

20. The apparatus of claim 12, wherein the determination of whether the node is expected to be scheduled is based on whether a resource upon which the node may be scheduled is expected to be scheduled for the upcoming transmission opportunity.

21. The apparatus of claim 20, wherein the means for identifying further determines that the node may be scheduled on the resource based on at least one transmit power associated with the resource.

22. The apparatus of claim 12, wherein the node comprises an access terminal.

23. An apparatus for communication, comprising: a node identifier configured to identify among a plurality of nodes a node that will be allowed to transmit a resource utilization message, wherein identifying the node comprises determining whether the node is expected to be scheduled for an upcoming transmission opportunity; a transmitter configured to transmit an authorization message that indicates that the identified node is allowed to transmit the resource utilization message; and a receiver configured to receive the resource utilization message transmitted by the identified node, the resource utilization message being transmitted based on receipt of the authorization message and based on determination of low quality of service at the identified node.

24. The apparatus of claim 23, wherein the determination of whether the node is expected to be scheduled is based on an ordering of nodes.

25. The apparatus of claim 23, wherein the determination of whether the node is expected to be scheduled is based on a defined maximum number of nodes that are allowed to clear interference for the upcoming transmission opportunity.

26. The apparatus of claim 23, wherein the determination of whether the node is expected to be scheduled is based on a defined percentage of nodes that are currently being serviced by an access point.

27. The apparatus of claim 23, wherein the determination of whether the node is expected to be scheduled is based on a defined percentage of active nodes.

28. The apparatus of claim 23, wherein the determination of whether the node is expected to be scheduled is based on an amount of data queued for transmission to the node.

29. The apparatus of claim 23, wherein the determination of whether the node is expected to be scheduled is based on an estimate of an amount of data that may be sent to the node during the upcoming transmission opportunity.

30. The apparatus of claim 29, wherein the estimate is based on an amount of data transmitted during a prior transmission opportunity.

31. The apparatus of claim 23, wherein the determination of whether the node is expected to be scheduled is based on whether a resource upon which the node may be scheduled is expected to be scheduled for the upcoming transmission opportunity.

32. The apparatus of claim 31, wherein the node identifier further determines that the node may be scheduled on the resource based on at least one transmit power associated with the resource.

33. The apparatus of claim 23, wherein the node comprises an access terminal.

34. A computer-program product for communication, comprising: a non-transitory computer-readable medium encoded with codes executable to: identify among a plurality of nodes a node that will be allowed to transmit a resource utilization message, wherein identifying the node comprises determining whether the node is expected to be scheduled for an upcoming transmission opportunity; transmit an authorization message that indicates that the identified node is allowed to transmit the resource utilization message; and receive the resource utilization message transmitted by the identified node, the resource utilization message being transmitted based on receipt of the authorization message and based on determination of low quality of service at the identified node.

35. An access point, comprising: an antenna; a node identifier configured to identify among a plurality of nodes a node that will be allowed to transmit a resource utilization message, wherein identifying the node comprises determining whether the node is expected to be scheduled for an upcoming transmission opportunity; transmitter configured to transmit, via the antenna, an authorization message that indicates that the identified node is allowed to transmit the resource utilization message; and a receiver configured to receive, via the antenna, the resource utilization message transmitted by the identified node, the resource utilization message being transmitted based on receipt of the authorization message and based on determination of low quality of service at the identified node.

36. An access terminal, comprising: a node identifier configured to identify among a plurality of nodes a node that will be allowed to transmit a resource utilization message, wherein identifying the node comprises determining whether the node is expected to be scheduled for an upcoming transmission opportunity; a transmitter configured to transmit an authorization message that indicates that the identified node is allowed to transmit the resource utilization message; a receiver configured to receive, via the antenna, the resource utilization message transmitted by the identified node, the resource utilization message being transmitted based on receipt of the authorization message and based on determination of low quality of service at the identified node; and a user interface configured to output an indication based on data received from the identified node.

37. A method of communication, comprising: receiving an authorization message that indicates that a node is allowed to transmit a resource utilization message because the node is expected to be scheduled for an upcoming transmission opportunity; and controlling transmission of the resource utilization message based on the received authorization message and based on determination of low quality of service at the node.

38. The method of claim 37, wherein the determination of low quality of service at the node comprises determining whether quality of service associated with received traffic at the node is less than or equal to a quality of service threshold.

39. The method of claim 37, wherein the expectation that the node is to be scheduled is based on an ordering of nodes.

40. The method of claim 37, wherein the expectation that the node is to be scheduled is based on a defined maximum number of nodes that are allowed to clear interference for the upcoming transmission opportunity.

41. The method of claim 37, wherein the expectation that the node is to be scheduled is based on a defined percentage of nodes that are currently being serviced by an access point.

42. The method of claim 37, wherein the expectation that the node is to be scheduled is based on a defined percentage of active nodes.

43. The method of claim 37, wherein the expectation that the node is to be scheduled is based on an amount of data queued for transmission to the node.

44. The method of claim 37, wherein the expectation that the node is to be scheduled is based on an estimate of an amount of data that may be sent to the node during the upcoming transmission opportunity.

45. The method of claim 44, wherein the estimate is based on an amount of data transmitted during a prior transmission opportunity.

46. The method of claim 37, wherein the expectation that the node is to be scheduled is based on whether a resource upon which the node may be scheduled is expected to be scheduled for the upcoming transmission opportunity.

47. The method of claim 46, wherein a designation of the resource upon which the node may be scheduled is based on at least one transmit power associated with the resource.

48. The method of claim 37, wherein the message is received from an access point.

49. An apparatus for communication, comprising: means for receiving an authorization message that indicates that a node is allowed to transmit a resource utilization message because the node is expected to be scheduled for an upcoming transmission opportunity; and means for controlling transmission of the resource utilization message based on the received authorization message and based on determination of low quality of service at the node.

50. The apparatus of claim 49, further comprising means for determining whether quality of service associated with received traffic at the node is less than or equal to a quality of service threshold.

51. The apparatus of claim 49, wherein the expectation that the node is to be scheduled is based on an ordering of nodes.

52. The apparatus of claim 49, wherein the expectation that the node is to be scheduled is based on a defined maximum number of nodes that are allowed to clear interference for the upcoming transmission opportunity.

53. The apparatus of claim 49, wherein the expectation that the node is to be scheduled is based on a defined percentage of nodes that are currently being serviced by an access point.

54. The apparatus of claim 49, wherein the expectation that the node is to be scheduled is based on a defined percentage of active nodes.

55. The apparatus of claim 49, wherein the expectation that the node is to be scheduled is based on an amount of data queued for transmission to the node.

56. The apparatus of claim 49, wherein the expectation that the node is to be scheduled is based on an estimate of an amount of data that may be sent to the node during the upcoming transmission opportunity.

57. The apparatus of claim 56, wherein the estimate is based on an amount of data transmitted during a prior transmission opportunity.

58. The apparatus of claim 49, wherein the expectation that the node is to be scheduled is based on whether a resource upon which the node may be scheduled is expected to be scheduled for the upcoming transmission opportunity.

59. The apparatus of claim 58, wherein a designation of the resource upon which the node may be scheduled is based on at least one transmit power associated with the resource.

60. The apparatus of claim 49, wherein the message is received from an access point.

61. An apparatus for communication, comprising: a receiver configured to receive an authorization message that indicates that a node is allowed to transmit a resource utilization message because the node is expected to be scheduled for an upcoming transmission opportunity; and a transmission controller configured to control transmission of the resource utilization message based on the received authorization message and based on determination of low quality of service at the node.

62. The apparatus of claim 61, further comprising a quality of service determiner configured to determine whether quality of service associated with received traffic at the node is less than or equal to a quality of service threshold.

63. The apparatus of claim 61, wherein the expectation that the node is to be scheduled is based on an ordering of nodes.

64. The apparatus of claim 61, wherein the expectation that the node is to be scheduled is based on a defined maximum number of nodes that are allowed to clear interference for the upcoming transmission opportunity.

65. The apparatus of claim 61, wherein the expectation that the node is to be scheduled is based on a defined percentage of nodes that are currently being serviced by an access point.

66. The apparatus of claim 61, wherein the expectation that the node is to be scheduled is based on a defined percentage of active nodes.

67. The apparatus of claim 61, wherein the expectation that the node is to be scheduled is based on an amount of data queued for transmission to the node.

68. The apparatus of claim 61, wherein the expectation that the node is to be scheduled is based on an estimate of an amount of data that may be sent to the node during the upcoming transmission opportunity.

69. The apparatus of claim 68, wherein the estimate is based on an amount of data transmitted during a prior transmission opportunity.

70. The apparatus of claim 61, wherein the expectation that the node is to be scheduled is based on whether a resource upon which the node may be scheduled is expected to be scheduled for the upcoming transmission opportunity.

71. The apparatus of claim 70, wherein a designation of the resource upon which the node may be scheduled is based on at least one transmit power associated with the resource.

72. The apparatus of claim 61, wherein the message is received from an access point.

73. A computer-program product for communication, comprising: a non-transitory computer-readable medium encoded with codes executable to: receive an authorization message that indicates that a node is allowed to transmit a resource utilization message because the node is expected to be scheduled for an upcoming transmission opportunity; and control transmission of the resource utilization message based on the received authorization message and based on determination of low quality of service at the node.

74. An access point, comprising: an antenna; a receiver configured to receive, via the antenna, an authorization message that indicates that a node is allowed to transmit a resource utilization message because the node is expected to be scheduled for an upcoming transmission opportunity; and a transmission controller configured to control transmission of the resource utilization message based on the received authorization message and based on determination of low quality of service at the node.

75. An access terminal, comprising: a receiver configured to receive an authorization message that indicates that a node is allowed to transmit a resource utilization message because the node is expected to be scheduled for an upcoming transmission opportunity; a transmission controller configured to control transmission of the resource utilization message based on the received authorization message and based on determination of low quality of service at the node; and a user interface configured to output an indication based on received data, wherein the receipt of the data is facilitated by the transmission of the resource utilization message.

\* \* \* \* \*